8019X
2 Sheets—Sheet 1.
J. INGHAM & J. DAVIS.
STEAM ENGINE.
Patented Feb. 12, 1834.
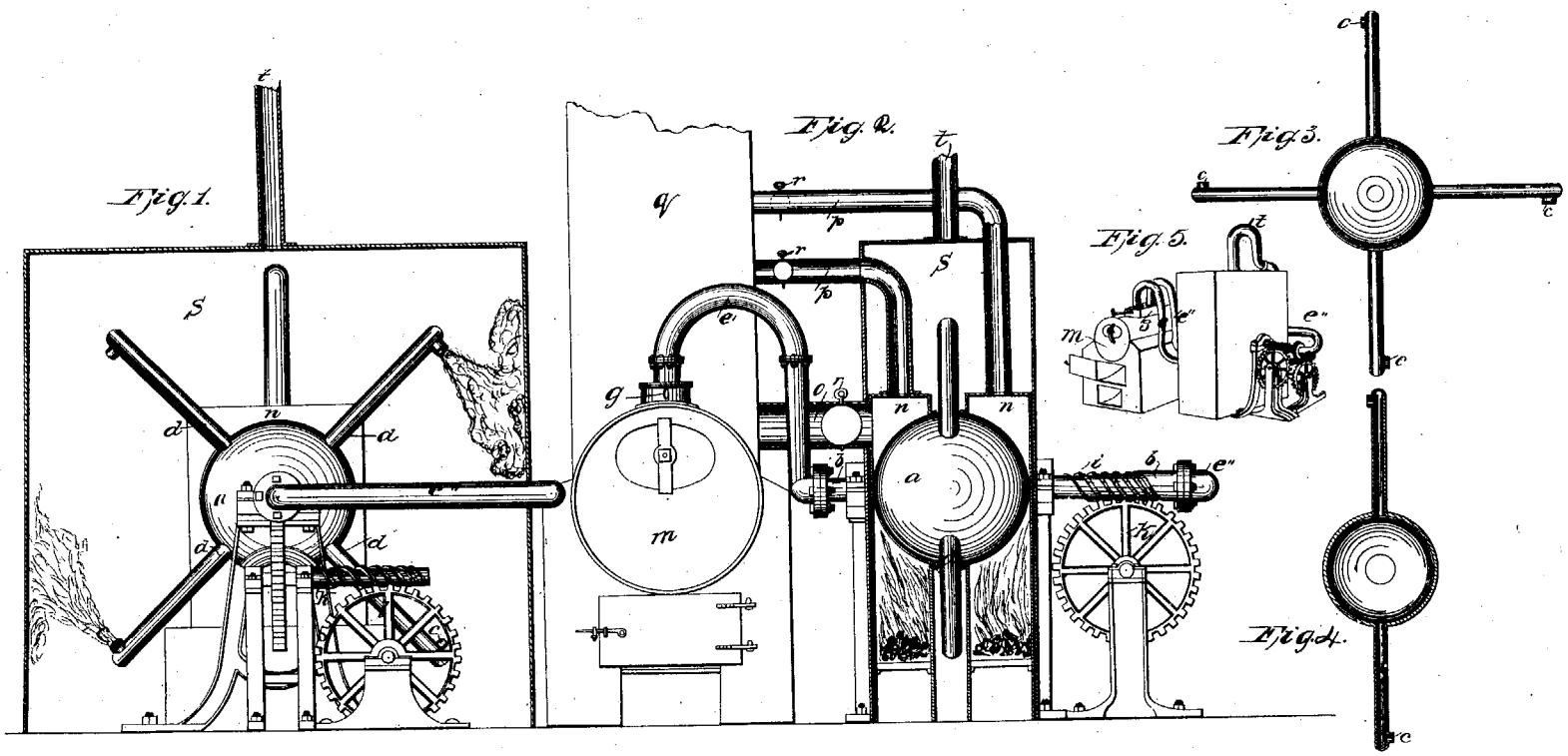

8019X
J. INGHAM & J. DAVIS.
STEAM ENGINE.
Patented Feb. 12, 1834.
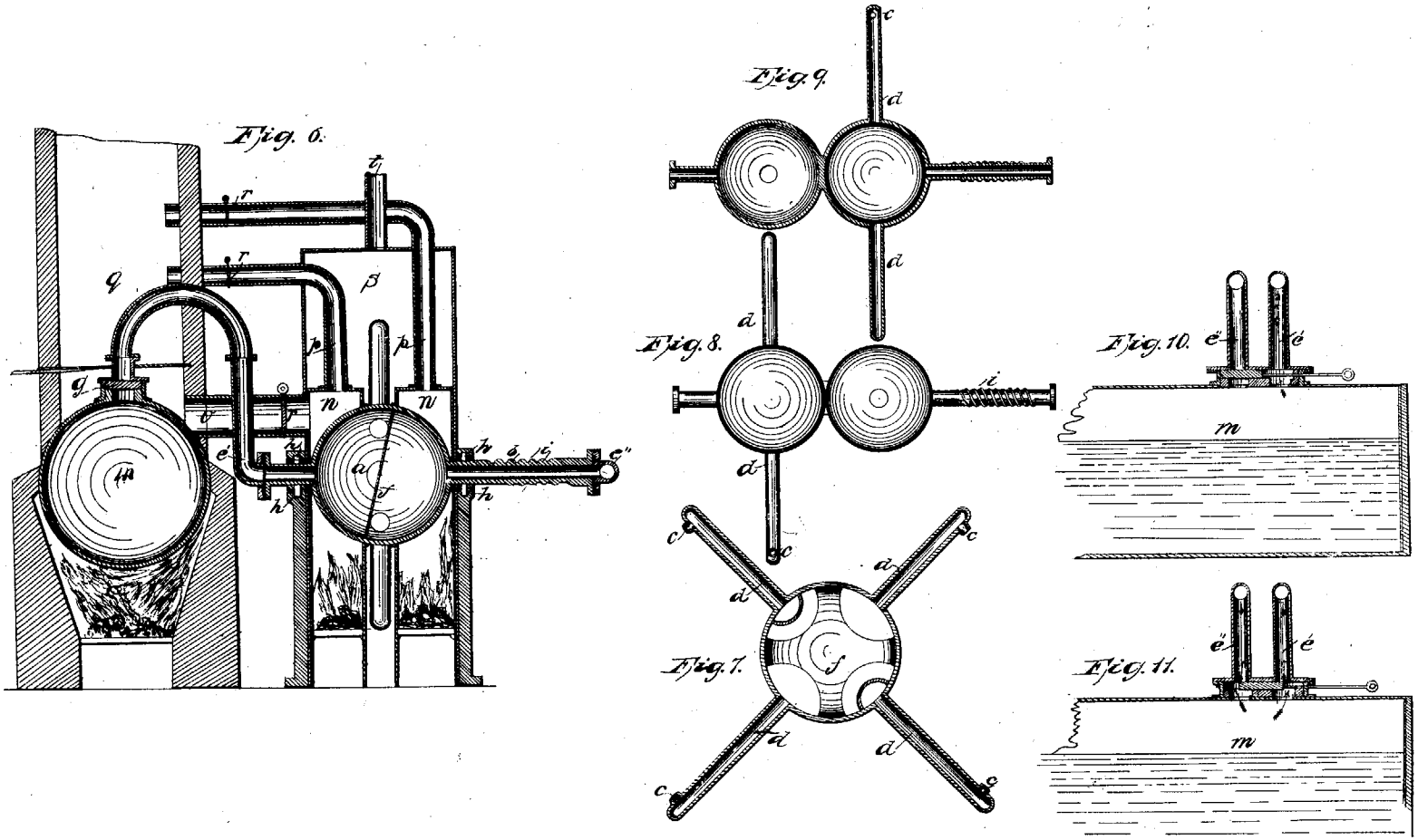

No. 15

Feb. 12. 1834

591

John Ingham & Julius Davis, Fabius N. York.

Letters Patent

The Schedule referred to in these Letters Patent and making part of the same containing a description in the words of the said John Ingham and Julius Davis themselves of their improvement in the use and application of Steam & the endless screw and in the apparatus for propelling machinery by steam To all to whom these presents shall come
Be it known that We John Ingham & Julius Davis of Fabius in the County of Onondaga in the State of New York have invented certain new and useful improvements in the use and application of Steam; and in the use and application of the endless screw, and in the machinery and apparatus to be used in propelling machinery by Steam of which the following is a description First. Said improvements consist in attaching to or connecting with the hollow globe or cylinder formerly invented such machinery as may be necessary to operate all kinds of machinery. Said Globe or cylinder is a metallic Globe or cylinder similar to that described in the mechanics Magazine, and is placed upon a hollow metallic shaft and revolves with it. Said shaft passing through the centre of the Globe or cylinder so that the same may be exactly balanced on the shaft. One two or more hollow arms or tubes are inserted in said Globe or cylinder of equal length and dimensions and balancing each other and on sides opposite to each other, and of such length as may be adapted to the machinery to be moved. These arms or tubes are closed at the outer ends, and have an orifice near the outer ends and on opposite sides of the arms from which the steam issues at right angles with the line of the shaft through which the steam passes into the globe or cylinder, and the steam thus issuing from said orifices produces by its reacting force a revolving motion of the ball or cylinder and shaft. The steam is conducted from the boiler into the end of the shaft by a tube connecting the boiler and the shaft, and through the shaft into the globe or cylinders and from the Globe or cylinder the into said arms or tubes — Second: To produce a reverse motion
or motion in an opposite direction to that before mentioned two other
hollow arms or tubes closed at the ends as before mentioned and construc
ted in the same manner and having similar orifices but opening in
directions opposite to those first mentioned are inserted in the globe or cyl
inder and the steam is conducted from the boiler into the other end of
the shaft by another tube and through the [illegible] shaft to the globe or
cylinder, and in this case the globe or cylinder is divided into two apart
ments or chambers one of which is connected with the arms or tubes first
mentioned and the other with the arms or tubes last mentioned. Or
to produce motion in opposite directions. there may be two globes or
cylinders placed on the shaft in the manner before mentioned with arms
or tubes as before described. having no internal passage for the steam from
one to the other, and receiving the steam from the boiler through the opposite
ends of the shaft by two distinct tubes. In order to conduct the steam to
either end of said shaft so as to produce motion in the desired direction.
the tubes through which the steam is conducted from the boiler to the shaft —
may be inserted in the boiler near to each other. and a moving or sliding valve
may be so constructed as when it closes the passage from the boiler through one
tube; it opens the other passage; and by half opening one of said passages
it will half close the other — In the latter case the steam will pass equally
from the boiler through each tube to each end of the shaft and into each
of the globes or cylinders when there are two (or into each apartment or cham
ber of the globe or cylinder when there is but one and divided as before men
tioned ) and will produce a balance of force and a cessation of motion.
and in this situation the steam may be kept on when the motion is stopped
without danger of explosion because the steam will continually escape
through its usual passages
As the force of the [illegible] hereafter mentioned upon the shaft will have
a tendency to press the shaft endways and to cause friction, in order to
balance and counteract that [illegible] or friction the orifices through
which the steam escapes from the arms or tubes may be so placed that
the steam will not pass from the tube in a line exactly at right angles with the shaft but a little obliquely & in a direction to give a
force opposite to that in which the screw presses the shaft. Or the
friction caused by the screw as above mentioned may be counteract
ed or balanced by a plate of iron fixed on or near the end of the shaft
upon friction rollers. And friction rollers may be placed under
the shaft revolving with the globe or cylinder in all cases when neces
sary to relieve the friction and also under the shafts of all other wheels.
To give motion to the machinery to be moved, an endless screw is placed
upon or near one end of the shaft on which the globe or cylinder is
(or on both ends as circumstances may require) and a wheel the shaft of
which is at right angles with the shaft on which the globe or cylin
der is placed; is so placed that the cogs or teeth match or mesh
with the screw and is moved by it as the screw revolves. A screw may be
fixed on or near the end of the shaft of said wheel and another wheel
may be connected with in the manner above described. and any other
number of wheels and screws may be placed and connected together in a sim
ilar manner for the purpose of increasing the power to any desired degree,
the effect of which will be to increase the power but to diminish the motion
Third - In order to save fuel and to make the greatest use of the heat
produced by any given quantity of fuel a box made of cast iron or some
other metal or suitable material may be so placed as to enclose the globe or
cylinder and to receive the heat escaping from the furnace and boiler.
And this box is so placed that the escaped heat may be let on to the globe
or cylinder or let off through the chimney without going into the globe or cylinder
by opening and closing a valve or damper fitted into the box for that
purpose. The heat being thus let into the globe or cylinder
will rarify and expand the enclosed steam and produce the same power with
less fuel. The globe or cylinder may be further heated if necessary or desira
ble by making a door in the outer side of said box and by burning coal
or other fuel in the box and under the globe or cylinder, or in any other
mode that may be deemed expedient
Fourth. For the purpose of using the steam after it has performed its of
fice in moving the machinery and of supplying it to other useful purposes a Jacket or box may be made around the globe or cylinder & inclosing
the arms from which the steam escapes which will receive all the steam as it
escapes from the arms. A pipe or tube may be inserted into this Jacket or
or box by which the steam may be conducted to any place where it may be
wanted for the purpose of warming Rooms, boiling water or any other use
to which it may be applied — This jacket or box is to be so placed as to re
ceive the steam without receiving the smoke from the furnace or boiler and
so as to prevent the steam from falling back upon the fire. A chimney
may be made of sheet iron or other suitable material, and so placed as to inclose
the ball or cylinder and the boxes made to receive the escape heat and
the steam through which the smoke may pass off and the steam also at
pleasure. The frame in which the Globe and Cylinder & boiler are placed
should be made of cast iron or some other incombustible material and the
boiler may be constructed and placed in the common manner, and the
heat may be applied in the usual way to the boiler. This Engine and ap
paratus may be used for propelling boats & vessels upon the water; for working
all kinds of mills and manufactories, for moving carriages on rail roads
and on the land; for moving vessels upon marine Railways, and for
raising & moving all heavy bodies and for all other purposes to which steam power
can be applied. — [illegible] We claim as invention and improvements
made by us and mentioned in the foregoing specification the following things.
1st The use and application of the endless screw in the manner and for
the purposes before mentioned — 2nd The manner of using the globe
or cylinder as herein described and especially the placing of the globe or cylin
der in the escape heat of the boiler and other heat as before stated & the valve
or damper by which the escape heat is let into the globe or cylinder or directed
from it at pleasure — 3rd The method of changing the direction & application of the steam
so as to produce motion in different directions as before described — 4th The producing of a
greater degree of power by the use of steam with less expense of fuel or machinery and with less
danger of explosion than many of the methods heretofore practised or known Dated the sixth day January AD 1834

Witnesses
A. J. [illegible] } [illegible]
C. O. [illegible]

Abel Clarke } witnesses to the
Geo. [illegible] } signature of John Ingham

John Ingham
[illegible] Davis

[illegible]

Drawing

1905 [illegible]